2 Sheets—Sheet 1.

J. WALKER.
Universal Joint-Coupling.

No. 221,375. Patented Nov. 4, 1879.

Attest,
W. H. H. Knight
W. Blackstock

Inventor,
Joseph Walker
by L. Hill,
His Attorney.

UNITED STATES PATENT OFFICE.

JOSEPH WALKER, OF SCRANTON, PENNSYLVANIA.

IMPROVEMENT IN UNIVERSAL-JOINT COUPLINGS.

Specification forming part of Letters Patent No. 221,375, dated November 4, 1879; application filed March 31, 1879.

*To all whom it may concern:*

Be it known that I, JOSEPH WALKER, of Scranton, in the county of Lackawanna and State of Pennsylvania, have invented a certain new and Improved Universal-Joint Coupling; and I do hereby declare the following to be a full, clear, and exact description of the same, reference being had to the accompanying drawings, forming part of this specification, in which—

Figure 1:
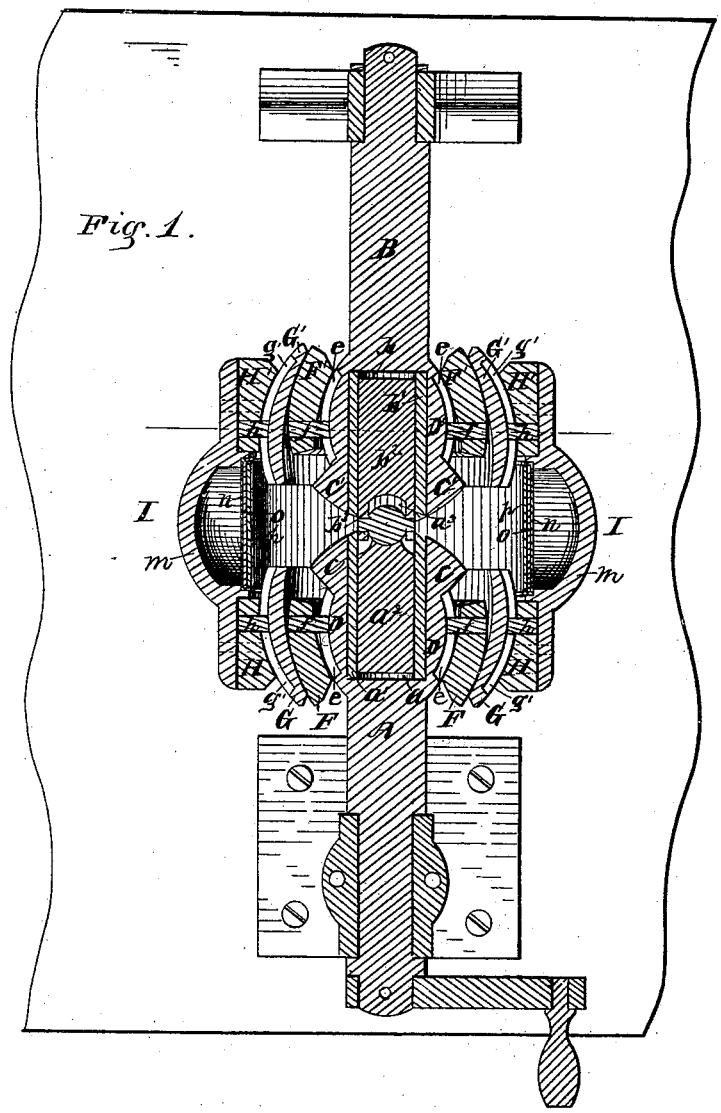
Figure 2:
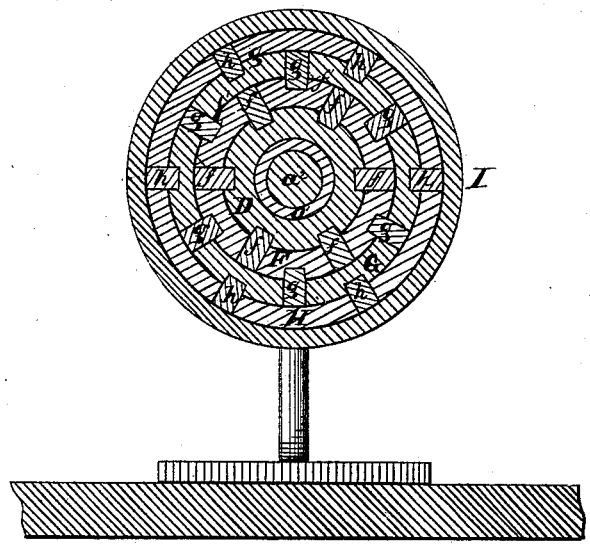
Figure 3:
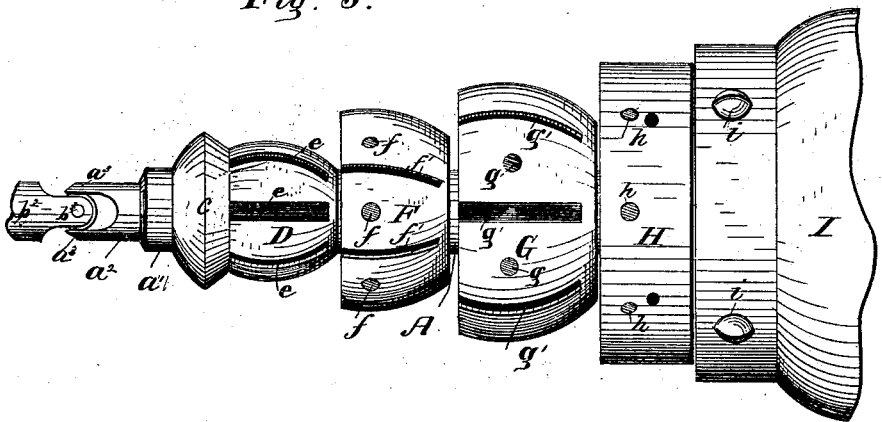

Figure 1 is a longitudinal horizontal section; Fig. 2, a transverse vertical section; and Fig. 3, a view of the several parts of the coupling disconnected.

Similar letters of reference in the several figures denote the same parts.

This invention relates to that class of shaft-couplings which are employed to transmit the power from one section of the shaft to another, and at the same time to allow the shafting to vibrate or change from one angle to another while in operation.

The object of the invention is to improve the construction and operation of such couplings by rendering them stronger and yet more flexible than heretofore; and to this end the invention consists in the devices and in the mechanical combinations hereinafter set forth.

In the drawings, A and B are the two sections of the shaft, which sections are to be so united that when power is applied to turn one it will be transmitted to and will turn the other, whether they be arranged in line with each other or at any angle not less than a right angle.

Each section A B is made hollow at its end, as shown at $a\, b$. A short tube, $a'\, b'$, works accurately, but freely, in each hollow, and inside of each tube is a cylindrical block or spindle, $a^2\, b^2$.

Each piece of tubing is capable of revolving or of sliding endwise in its hollow supporting-socket. Each block or spindle $a^2\, b^2$ is capable of revolving and sliding endwise in the hollow tubing which supports it, and the contiguous ends of the two blocks or spindles are united to each other by a universal gimbal-joint, $a^3\, b^3$, as shown.

It will be seen from this description that the connecting-tubing and gimbal-blocks do not operate to transmit power from one section of the shaft to another, but only to hold the ends of the shafts in the proper relation to each other.

Each shaft-section terminates in a stout strong circular disk, $c$ or $c'$, rounded on its outer face, in order that the two disks may bear properly against each other when the shaft-sections are at different angles. Each is also rounded or beveled on its opposite side, to accommodate the movements of the cup-shaped transmitting-sections, hereinafter described.

Each shaft-section is also provided with a ball-head, D or D', just inside of or behind the disk $c\, c'$, as shown; and the two ball-heads are longitudinally slotted from the base of disk $c$ $c'$ nearly to the opposite ends of the heads, as represented at $e\, e\, e$.

Around each ball-head is arranged a cup-shaped section, F F', having internally-projecting pins $f$, which extend into the slots $e\, e$ $e$, said pins being headed at their inner ends and applied internally to the sections F F'. Each section F F' is also longitudinally slotted or grooved at $f'$ on its outer sides, similarly to the ball-heads. Each section F F' is held in a larger surrounding section, G G', constructed similarly to F F', except in point of size. The pins $g$, Fig. 3, of sections G G' work in the grooves $f'$ of sections F F'. The outer grooves of sections G G' are represented at $g'$. Each section G G' is held in a surrounding ring, H H', the inside of which is beveled or rounded to fit the outside of the contained sections G G'. Pins $h$, similar to those hereinbefore described, extend from the rings H H' into the outer grooves, $g'$, of the contained sections. The two rings H H' fit closely into the opposite ends of a hollow casting, I, and are firmly secured thereto by stout screws $i$, or rivets, dovetail keys, wedges, or other fastening. The casting I is shaped somewhat like a carriage-wheel hub, having a peripheral bulge or enlargement, $m$, which forms an internal annular oil-chamber. The oil is communicated from the chamber by means of a wick or piece of cloth, $n$, held in place by a plate, $o$, secured to the casting by dovetail-bars $p$.

The operation of the device is as follows: The parts all being secured together, as above described, and one of the shaft-sections, A, for example, set in motion, power is communicated from the ball-head D to the section F, thence to G, and thence to ring H by means of the interengaged pins and slots in these several parts. The rings being firmly fixed to the casting I, the power is then transmitted directly to I, and thence to ring H' at the opposite end of I. From ring H' it is transmitted inward through sections G' F' and ball-head D' to the shaft-section B in a manner the reverse of that described above. The section B is thus put in motion from section A whatever may be the angle at which these sections are arranged with relation to each other, and the motion is continued however the shaft-sections may change their angles meanwhile.

The number of cup-shaped sections may be varied at will, although I have found two on each shaft-section to be sufficient for the purpose.

The form and construction of the several parts may be varied at pleasure, so long as they perform substantially the offices herein described in the manner substantially as indicated.

The disk-shaped ends $c$ $c'$ may be omitted, if desired, although I recommend their use.

The tubes $a'$ $b'$ may be omitted where there is but slight play to the shafts.

The shaft-sections may be coupled to the line or lines of shafting in any known way, and driven by any power.

Other modes of oiling the parts may be employed in lieu of that herein described, although I prefer the construction shown for that purpose.

Regulating-springs may be attached to the opposite sides of a shaft-section, A or B, and thence extend to the outer cup-plate or section, G or G', for the purpose of holding such section properly in position, if preferred.

It is obvious that, for many purposes, it will only be necessary to use a single ball-head with the connecting-plates F G, ring H, and covering plate or casting I, the latter plate or casting being directly affixed to the opposite shaft-section B. In such construction there would be less flexibility than with the double-acting construction above described; still for many purposes it would answer perfectly.

The coupling above described may be used for all kinds of shafting, tumbling-rods, or other similar devices for transmitting power, including instruments for boring or drilling at an angle in mining and tunneling; for hand-braces for boring or drilling at an angle; for transmitting the power to the cutters in harvesting machinery; for the head-gear of centrifugal drying-machines; for the shafting of steam ships and boats, and, particularly, for the main shaft at the stern of screw-propeller ships, for operating the propeller-wheel either right or left, in order to change the direction of the ship without the use of a rudder, and, in general, for every analogous purpose where it will be practicable or useful.

I claim as my invention—

1. The shaft-coupling herein described, consisting of the outer plate, I, the shaft-sections A B, one or both having a slotted or grooved ball-head, and the connecting-sections F G, and rings H, with their several pins and grooves, substantially as set forth.

2. The combination of the gimbal-jointed interior spindles with the ball-headed shaft-sections, the plates F G', the rings H, and the external plate, I, substantially as described.

3. A cup-shaped section, F or G, or its equivalent, having internal projecting pins or studs and external grooves, substantially as described.

4. The rings H H', having internal spherical bevel, with internally-projecting pins, and having a cylindrical external contour, substantially as described.

5. The castings or plates I, having end flanges, with screw-holes to retain the rings H H', as described, and having the enlargement $m$, in combination with the internal wick or cloth, the retaining-plate, and the fastening devices.

JOSEPH WALKER.

Witnesses:
GEO. B. HAND,
H. B. BATTIN.